(No Model.)
A. STIRLING.
PACKINGLESS VALVE.
No. 486,268. Patented Nov. 15, 1892.
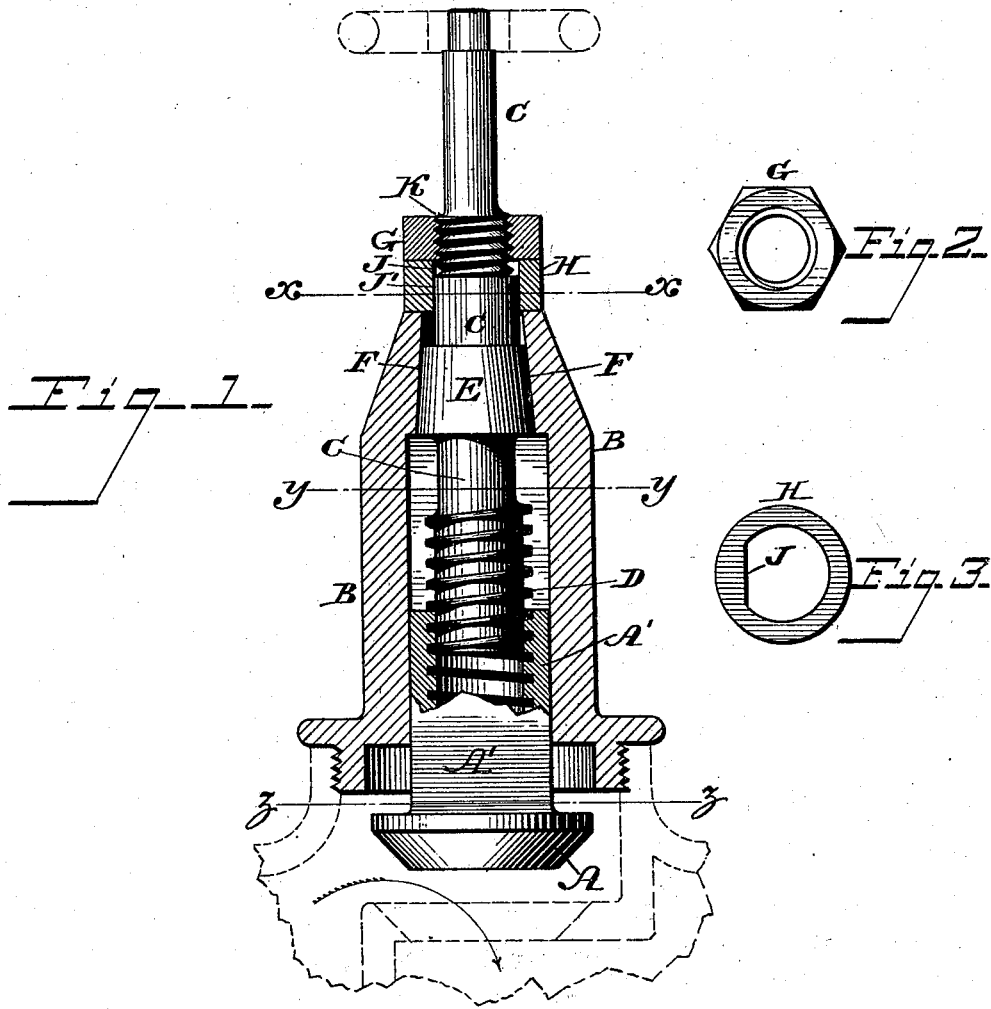
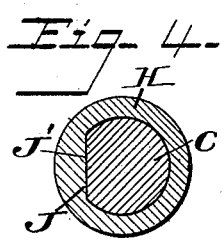
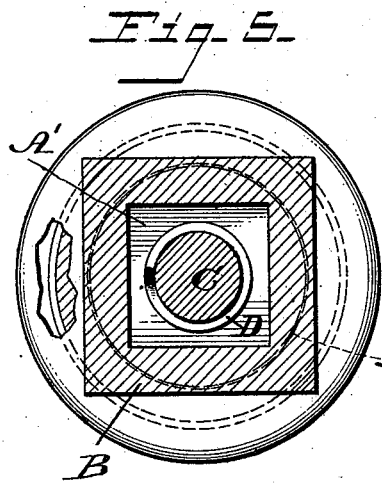
WITNESSES:
L. Douville,
P. F. Eagle
INVENTOR
Archibald Stirling
BY
ATTORNEY.

UNITED STATES PATENT OFFICE.

ARCHIBALD STIRLING, OF PHILADELPHIA, PENNSYLVANIA, ASSIGNOR OF ONE-HALF TO ANTONIO C. PESSANO, OF SAME PLACE.

PACKINGLESS VALVE.

SPECIFICATION forming part of Letters Patent No. 486,268, dated November 15, 1892.

Application filed April 6, 1891. Serial No. 387,836. (No model.)

*To all whom it may concern:*

Be it known that I, ARCHIBALD STIRLING, a citizen of the United States, residing in the city and county of Philadelphia, State of Pennsylvania, have invented a new and useful Improvement in Packingless Valves, which improvement is fully set forth in the following specification and accompanying drawings.

My invention relates to improvements in valves; and it consists of a valve-stem so constructed as to form a tight joint with the box or shell in such manner that the use of packing is obviated and to sustain the adjusting-nut and transfer the pressure thereof directly upon the top of the valve casing or cap, thus avoiding crushing of the handle, as is liable to occur in valves of the class as heretofore constructed, where the adjusting-nut tightens directly against said handle.

It further consists of means for providing for the wear of the bearing portions of the rotatable stem of a valve.

It further consists of means for preventing the movement of the stem endwise in its bearings during the rotation thereof in operating the valve.

Figure 1 represents a central sectional view in elevation of a valve embodying my invention. Figs. 2 and 3 represent plan views of detail portions of the device. Figs. 4, 5, and 6 represent horizontal sections on lines $xx$, $yy$, and $zz$, Fig. 1, respectively.

Similar letters of reference indicate corresponding parts in the several figures.

Referring to the drawings, A designates a conical head having an angular or non-rotatable shank A', fitted in a corresponding angular portion of a cap or box B, which is attached to the valve-chamber casing and wherein the stem C rotates. The said shank A' is provided with an interiorly-threaded opening, in which the threaded end D of the stem is adapted to rotate, so as to move the head A' in said box, and thereby either place the head on or lift it from its seat. The stem C has an enlarged portion E, of conical form, which is in contact with a coinciding conical portion F of the box B, the latter thereby forming a swivel for said stem with the box. It will be seen that the conical bearing F prevents the outward movement of the stem during its rotation, and to prevent its inward movement a nut G is fastened on the stem outside of the box and adapted to bear against a washer H, which is interposed between the nut and the top of the box, said washer having a straight inner portion J coinciding and in contact with a cut-away portion J' on the said stem, thereby being adapted to rotate with the stem and also permit the latter to move therein.

To adjust the stem so as to provide for the wear of the conical portion E thereof or its bearing, the nut G is secured on a threaded portion K of the stem, so that when rotated thereon in one direction without rotating the stem the latter will be drawn outward, bringing the conical portion E in close contact with its bearing F.

During the operation of opening and closing the valve the nut and washer rotate with the stem, the frictional contact of the nut with the washer causing the former to rotate with the latter; but if needed to insure their co-operation the nut may be secured to said washer in any suitable manner, as by inserting screws in the said parts.

It will be seen that by the means herein described a tight joint can be obtained without the need of packing.

Having thus described my invention, what I claim as new, and desire to secure by Letters Patent, is—

1. The conical valve and non-rotatable shank carrying the same, said shank having a threaded opening therein, the stem C, having threads on its lower end, the same entering and engaging said shank, threads K at top, and a cone intermediate of said threads, in combination with the box having its inner face conforming to said shank and cone E and an adjusting-nut which is supported on the top of the box and engages with the upper threads of the stem, substantially as described.

2. A conical valve, a non-rotatable shank carrying the same, and a threaded valve-stem engaging said shank and provided with a cone, in combination with the box having its interior conforming to said shank and cone, a nut secured to the upper end of the stem, and the washer which is interposed between said nut and box and rotates on the latter, the inner surface of said washer and the contiguous part of the stem having flat portions which are in contact, substantially as described.

3. A conical valve and a threaded stem fitted thereto, a cone on said stem, and a box receiving the shank of said valve and conforming to said shank and cone, in combination with a washer which is rotatively supported on the top of the box, and connected with the valve-stem by means of an adjusting-nut which is attached to said stem and engages with said washer, substantially as described.

4. In a packingless valve, a casing with an angular chamber in the lower portion thereof, with an upper conical opening F, a valve with a non-rotatable angular shank or extension A', having a screw-threaded opening in the upper portion thereof and a lower conical head, a stem C, having threads on its lower end to engage the threaded opening of the head and upper screw-threads K, a cylindrical sleeve directly below the threads K and having a cut-away portion J', a cone E, directly below and continued from the said cylindrical sleeve, said cone being located within the conical opening F of the casing and preventing upward movement of the stem C by being in contact with the gradually-converging walls of said opening, a washer H on the upper part of the casing and having a flat portion J to engage the cut-away portion J' of the sleeve C, and a nut G, engaging the upper screw-threads K and bearing directly on top of the washer H, said washer being located on the upper end of casing A, substantially as described.

ARCHIBALD STIRLING.

Witnesses:
JOHN A. WIEDERSHEIM,
A. P. JENNINGS.